US007386326B2

(12) United States Patent
Sundararajan et al.

(10) Patent No.: US 7,386,326 B2
(45) Date of Patent: Jun. 10, 2008

(54) PROGRAMMABLE TASK-BASED CO-PROCESSOR

(75) Inventors: Vijay Sundararajan, Dallas, TX (US); Sriram Sundararajan, Plano, TX (US); Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 448 days.

(21) Appl. No.: 10/235,462

(22) Filed: Sep. 4, 2002

(65) Prior Publication Data
US 2003/0148793 A1 Aug. 7, 2003

Related U.S. Application Data

(60) Provisional application No. 60/317,362, filed on Sep. 4, 2001.

(51) Int. Cl.
*H04M 1/00* (2006.01)
(52) U.S. Cl. .................. 455/561; 455/562; 455/418
(58) Field of Classification Search ............. 455/560, 455/561, 450, 451, 452, 455; 375/344, 316, 375/336
See application file for complete search history.

(56) References Cited

U.S. PATENT DOCUMENTS 4,449,248 A * 5/1984 Leslie et al. ............... 340/7.36
5,734,686 A * 3/1998 Kuramatsu ................. 375/368
5,864,570 A * 1/1999 Dorenbosch et al. ....... 714/704
6,346,911 B1 * 2/2002 King ...................... 342/357.06
6,396,884 B1 * 5/2002 Maruyama ................. 375/344
6,549,784 B1 * 4/2003 Kostic et al. ............... 455/501
6,901,270 B1 * 5/2005 Beach ....................... 455/563
7,165,173 B1 * 1/2007 Herle ........................ 713/151
2001/0014603 A1 * 8/2001 Bucknell et al. ........... 455/420
2001/0055038 A1 * 12/2001 Kim ......................... 345/810
2001/0055948 A1 * 12/2001 Ikeda et al. ............... 455/13.3
2002/0034967 A1 * 3/2002 Taniguchi et al. ......... 455/562
2002/0049061 A1 * 4/2002 Pinola ....................... 455/452
2003/0003961 A1 * 1/2003 Li et al. .................... 455/562
2003/0040275 A1 * 2/2003 Bridgelall .................. 455/41
2004/0092277 A9 * 5/2004 Elam ........................ 455/506

* cited by examiner

Primary Examiner—Duc Nguyen
Assistant Examiner—Dai A Phuong
(74) Attorney, Agent, or Firm—Robert D. Marshall, Jr.; W. James Brady; Frederick J. Telecky, Jr.

(57) ABSTRACT

A programmable co-processor system comprising a datapath, a microprogram, and a microcontroller is provided. The datapath includes one or more datapath elements operable to receive input signals. The microprogram memory includes a microprogram operable to control the datapath in order to process the input signals. The microcontroller is operable to modify the microprogram based on a modification command.

4 Claims, 4 Drawing Sheets

PROGRAMMABLE TASK-BASED CO-PROCESSOR

RELATED APPLICATION

This application claims the benefit under 35 U.S.C. § 119(e) of U.S. Provisional Application No. 60/317,362, filed Sep. 4, 2001.

TECHNICAL FIELD OF THE INVENTION

This invention relates in general to task-based co-processors, and, more particularly, to a programmable task-based co-processor.

BACKGROUND OF THE INVENTION

A co-processor is an additional processor that performs one or more specific tasks to reduce the load on the main processor, or CPU. For example, many personal computers include co-processor chips to perform specific arithmetic functions, which may significantly increase the speed of the computer.

One particular application in which co-processors are commonly used is for processing wireless telecommunication signals. Telecommunication signals transmitted by mobile devices, such as mobile phones, laptops, or PDAs, may be received by a wireless antenna and communicated to a base station node. The base station node then processes the received signals before sending them toward their final destination. The base station node may include one or more co-processors to perform specific tasks in processing the signals. For example, a base station node operating under the 3GPP FDD standard may include one or more co-processors to perform correlation functions for RAKE receiver operations, delay path searching, and preamble detection.

SUMMARY OF THE INVENTION

In accordance with the present invention, a programmable task based co-processor is provided that substantially eliminates or reduces the disadvantages and problems associated with previously developed co-processors.

According to one embodiment, a programmable co-processor system comprising a datapath, a microprogram, and a microcontroller is provided. The datapath includes one or more datapath elements operable to receive input signals. The microprogram memory includes a microprogram operable to control the datapath in order to process the input signals. The microcontroller is operable to modify the microprogram based on a modification command.

According to another embodiment, a programmable co-processor system includes a plurality of control modules. Each control module includes a datapath and a microprogram memory. The datapath includes one or more datapath elements operable to receive input signals. The microprogram memory includes a microprogram operable to control the datapath in order to process the input signals. The programmable co-processor system also includes one or more microcontrollers. Each microcontroller is operable to modify one or more of the plurality of microprograms based on one or more modification commands.

According to yet another embodiment, a method for processing signals is provided. The method includes storing a microprogram in a microprogram memory, receiving a modification command at a microcontroller, translating the received modification command into control information, modifying the microprogram based on the control information, receiving input signals at a datapath including one or more datapath elements, and controlling the datapath based at least in part on the modified microprogram in order to process the input signals.

Various embodiments of the present invention may benefit from numerous advantages. It should be noted that one or more embodiments may benefit from some, none, or all of the advantages discussed below.

One advantage is that a fully (or at least partially) programmable or re-programmable co-processor may be provided. A co-processor may include a microprogram that includes control words used to drive a datapath designed to process input signals, such as signals communicated from a wireless device. The microprogram may be adjusted, or reprogrammed, during operation to perform a variety of tasks based on a series of task commands communicated by a processor. For example, the microprogram may be adjusted, or reprogrammed, during operation to generate relatively complex bit patterns used to drive the datapath, or to adjust such bit patterns based on particular feedback. In addition, the microprogram may be modified (one or more times) as desired by various customers, such as to meet the configuration standards required by the particular customers.

Another advantage is that the microcontroller may modify or reprogram particular signal patterns generated by a hardware control module by modifying or updating particular pattern properties (such as a phase and period associated with a particular pattern) which at least partially define the signal patterns, rather than updating or modifying the individual bits which form the signal patterns. Thus, in particular embodiments, the microcontroller need not operate at clock rate in order to modify or reprogram the signal patterns used to control the datapath.

Yet another advantage of the invention is that task-specific data, such as data associated with a particular mobile user, may be stored in a supplemental memory separate from the microprogram memory in which the microprogram is stored. This may reduce the size of the microprogram and, more particularly, the size of the control words in the microprogram, which may be advantageous or even necessary for the desired operation of co-processor. For example, this may allow more complex microprograms to be used, and may increase the speed at which such microprograms may be executed.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 6 of the drawings, in which like numerals refer to like parts.

Figure 1:
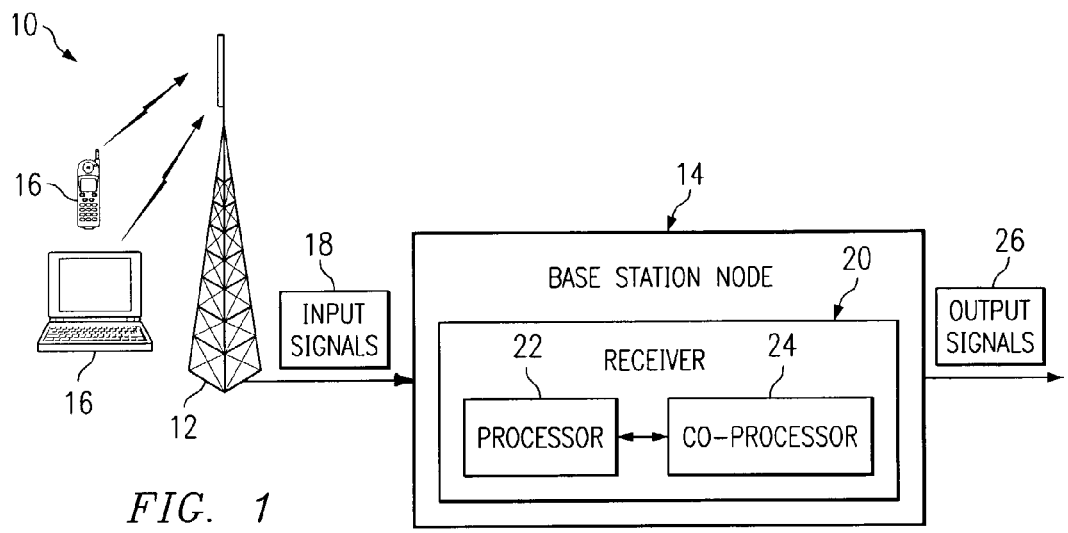
FIG. 1 illustrates a wireless telecommunication system in accordance with an embodiment of the present invention.

FIG. 1 illustrates a wireless telecommunication system 10 in accordance with an embodiment of the present invention. Telecommunications system 10 includes an antenna 12 coupled to a base station node 14. Antenna 12 is operable to receive wireless radio signals from one or more mobile stations 16, such as mobile telephones, laptops, or personal digital assistance (PDAs), and to communicate these signals to base station node 14 as input signals 18. Base station node 14 includes a receiver 20 operable to process or analyze input signals 18 to generate output signals 26 that may be communicated to another component or node of telecommunications system 10. Receiver 20 may also be operable to process or analyze input signals 18 to generate output signals 26 that may be used by receiver 20 itself, such as to control or modify the operation of receiver 20, as discussed in greater detail below with reference to FIG. 2.

In particular embodiments, receiver 20 may include a processor 22 coupled to one or more co-processors 24. In the embodiment shown in FIG. 1, processor 22 comprises a digital signal processor (DSP) and co-processor 24 comprises a programmable correlation co-processor (PCCP). In this embodiment, co-processor 24 may be reconfigured or reprogrammed in order to perform a variety of tasks or to operate in a variety of environments based on commands received from processor 22, as described in greater detail below with reference to FIGS. 2 through 6.

Figure 2:
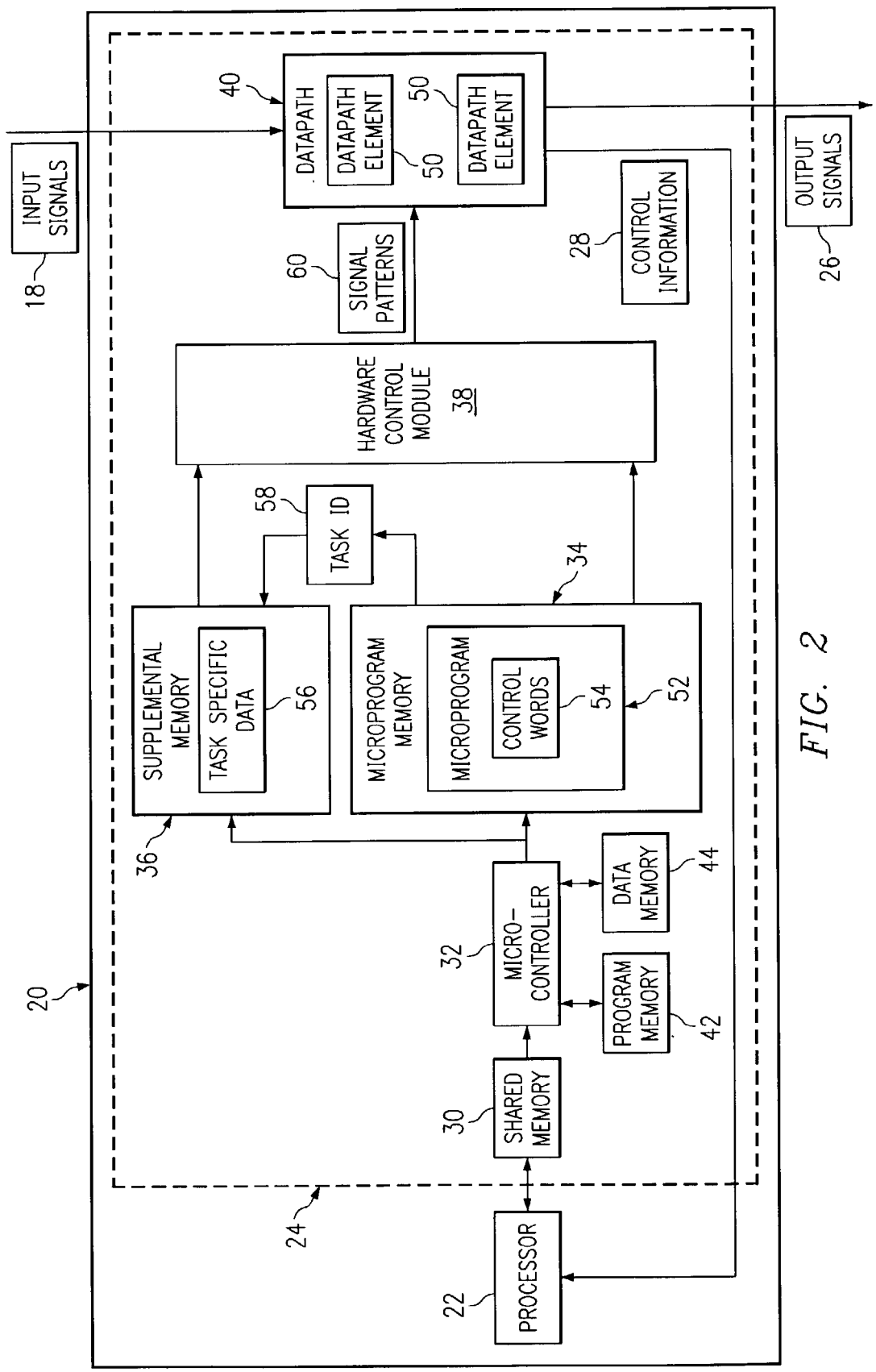
FIG. 2 illustrates a receiver including a processor and programmable correlation co-processor and operable to process wireless input signals in accordance with an embodiment of the present invention.

As shown in FIG. 2, receiver 20 includes processor 22 and programmable correlation co-processor 24 and is operable to process input signals 18 to generate output signals 26 that may be communicated to another component or node of telecommunications system 10, and control information 28 that may be used by processor 22, such as to control or modify the operation of receiver 20. Co-processor 24 may include a shared memory 30, a microcontroller 32, a microprogram memory 34, a supplemental memory 36, a hardware control module 38, and a datapath 40. Microcontroller 32 may be coupled to a program memory 42 and a data memory 44. Co-processor 24 may be coupled to processor 22 by an external memory interface (EMIF) or any other interface suitable for coupling processors.

Datapath 40 may comprise one or more datapath elements 50 operable to perform various operations for processing input signals 18. Microprogram memory 34 may include or store a microprogram 52 operable to control datapath 40 to process input signals 18. Supplemental memory 36 may be operable to store task-specific data 56 corresponding with one or more tasks. Microprogram 52 may comprise a plurality of control words 54, each operable to control one or more datapath elements 50 to perform a micro-task. In some embodiments, each task includes or corresponds with a particular number of micro-tasks. Each control word 54 in microprogram 52 may include a task identifier 58 operable to identify the task corresponding with that control word 54. Storing task-specific data 56 in supplemental memory 36 reduces the size of microprogram 52 and, more particularly, the size of control words 54, which may be advantageous or even necessary for the desired operation of co-processor 24.

In particular embodiments, each task corresponds with an active user, such as a mobile station 16 transmitting signals to receiver 20 via antenna 12. Each task may include or correspond with a certain number of micro-tasks and each micro-task may consume one clock cycle. Data common to each micro-task corresponding with a particular task may be stored as task-specific data 56 in supplemental memory 36 so that each control word 54 (which each correspond with one micro-task) need not store-such common data, thus reducing the size of control words 54 and microprogram 52. For example, in a particular embodiment operating in a code division multiple access (CDMA) standard, the pseudo-random sequence defining each active user may be stored as task-specific data 56 in supplemental memory 36.

Hardware control module 38 may be operable to generate signal patterns 60 based on data received from microprogram memory 34 and supplemental memory 36. Signal patterns 60 are used to control datapath elements 50 in order to process input signals 18. Hardware control module 38 may include various hardware components such as a reset pattern generator and an address generator, for example.

Microcontroller 32 may be operable to modify or reprogram microprogram 52 and/or task-specific data 56 based on task commands received from processor 22. Shared memory 30 provides an interface for the communication of data from processor 22 to microcontroller 32. In the embodiment shown in FIG. 2, microcontroller 32 is operable to execute a program stored in program memory 42 to interpret task commands received from processor 22 to determine what data to write into microprogram memory 34 and/or supplemental memory 36, such as to add, modify, remove or replace one or more control words 54 in microprogram 52 or to add, modify, remove or replace task-specific data 56 stored in supplemental memory 36. In this manner, microcontroller 32 is operable to modify, reprogram, or reconfigure microprogram 52 and/or task-specific data 56 based on commands received from processor 22. Data memory 44 may store context data associated with various users which may be used by microcontroller 32 in determining new control words 54 and/or task-specific data 56 to write into microprogram memory 34 and supplemental memory 36, respectively.

In one embodiment, microcontroller 32 is an Advanced RISC Machine (ARM) processor. However, microcontroller 32 may be any other type of microprocessor suitable to control a microprogram based on commands received from a processor without departing from the scope of the present invention.

In operation, processor 22 communicates task commands to microcontroller 32 using shared memory 30 as an interface. Microcontroller 32 interprets or translates the data commands using a program stored in program memory 42. Based on these translations or interpretations, microcontroller 32 writes new data into microprogram 52 and/or task-specific data 56. For example, microcontroller 32 may load new words into, or replace existing words within, microprogram 52.

Control words 54 may be communicated to hardware control module 38 in sequential order in a repeating loop. When a particular control word 54 is to be communicated to hardware control module 38, the task identifier 58 is used to identify the task corresponding with the particular control word 54 (or micro-task). The task-specific data associated with the identified task is communicated to hardware control module 38 along with the particular control word 54. Hardware control module 38 may generate one or more signal patterns 60 based on the received task-specific data and control word 54, as described in greater detail below with reference to FIG. 3.

Signal patterns 60 may be used to control one or more datapath elements 50 in order to process input signals 18 to generate output signals 26 and/or control information 28. Output signals 26 and control information 28 may include none, some, or all of the same signals or information. As shown in FIG. 2, control information 28 may be communicated to processor 22 and used by processor 22 in generating new task commands. Processor 22 continues to send new task commands to microcontroller 32, which continues to translate the task commands and modify or reprogram microprogram 52 and/or task-specific data 56 accordingly.

In this manner, microprogram 52 and/or task-specific data 56 may be repeatedly or continuously adjusted, or reprogrammed, during operation of co-processor 24 to perform a variety of tasks based on a series of task commands communicated by processor 22. Thus, in some embodiments, co-processor 24 may be said to be fully programmable. In addition, since microprogram 52 may be loaded and controlled by microcontroller 32 based on instructions or task commands communicated by processor 22, co-processor 24 may be configured and reconfigured to process input signal 18 as desired by various customers.

Figure 3:
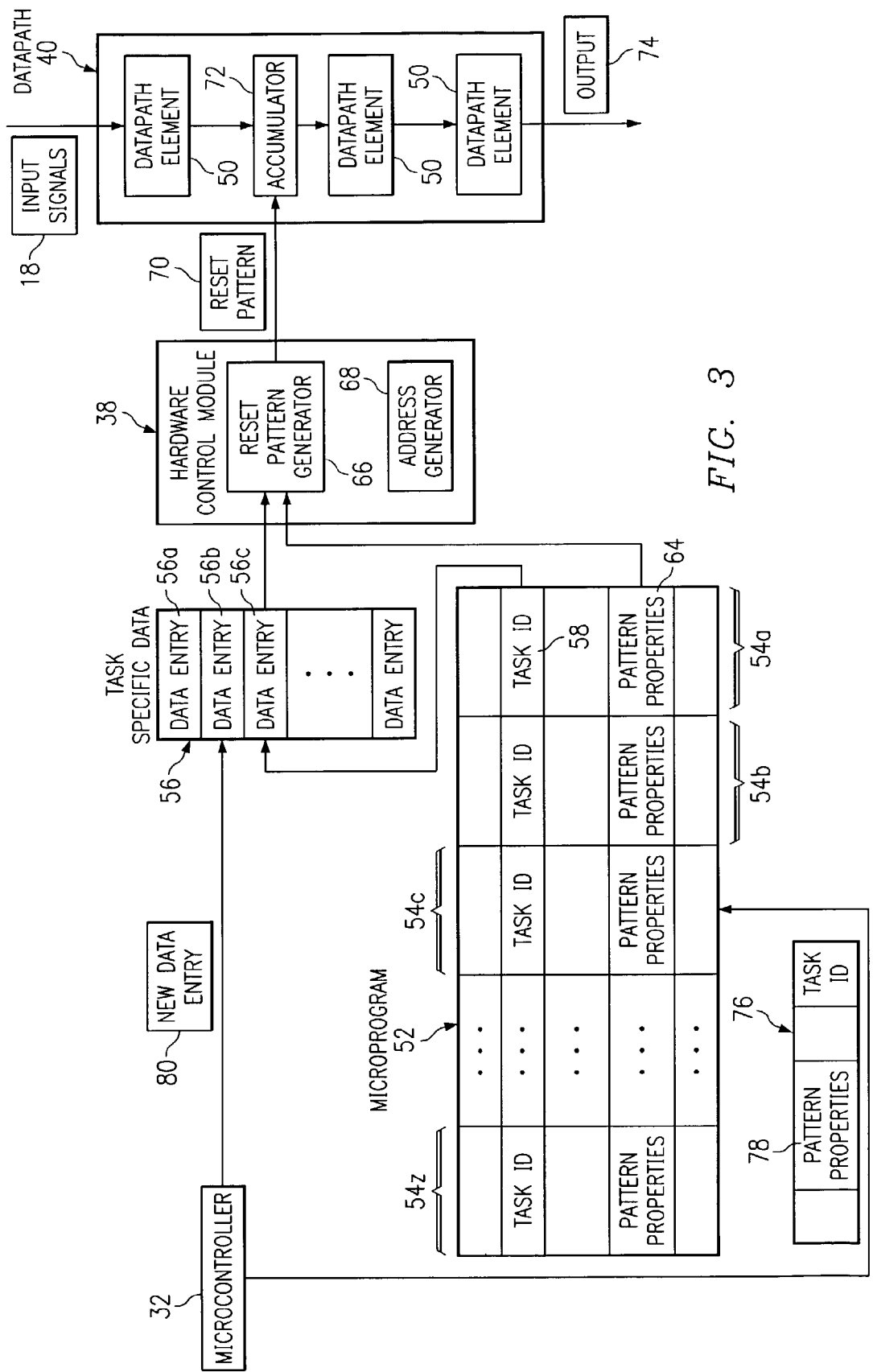
FIG. 3 illustrates a method of generating a reset pattern for a datapath element based on a microprogram stored in the programmable correlation co-processor of FIG. 2.

FIG. 3 illustrates a method of generating a reset pattern for a datapath element 50 based on reprogrammable microprogram 52. Microprogram 52 may include a particular number of control words 54, such as control words 54a through 54z as shown in FIG. 3. In a particular embodiment, for example, microprogram 52 includes 2,048 control words. The control words 54 are communicated to hardware control module 38 in sequential order in a continuous loop. For example, as shown in FIG. 3, control word 54a is communicated to hardware control module 38, followed by control word 54b, followed by control word 54c, and so on through control word 54z, before looping back to control word 54a.

Task specific data 56 may include a particular number of data entries, each corresponding with a particular task or user, such as data entries 56a, 56b, and 56c, as shown in FIG. 3. In one embodiment, task specific data 56 includes data entries for up to 64 tasks or users.

Control word 54a may include task identifier 58 and a set of pattern properties 64. Task identifier 58 may identify, or point to, the data entry (in the example shown in FIG. 3, data entry 56C) associated with the task corresponding to control word 54a. Pattern properties 64 may include one or more parameters that at least partially define a signal pattern operable to control one or more datapath elements 50. For example, pattern property 64 may include parameters such as phase and period, for example, to define at least a portion of a signal pattern, such as the reset bit patterns shown in FIGS. 4 and 5, for example.

Hardware control module 38 may include various hardware components operable to interpret data in control words 54, such as a reset pattern generator 66 and an address generator 68. Reset pattern generator 66 may be operable to generate a reset pattern 70, such as the reset bit patterns shown in FIGS. 4 and 5, based on pattern properties 64 and/or data entry 56c identified by task identifier 58.

Datapath elements 50 may include a variety of mathematical operators, such an accumulator 72. Accumulator 72 may be operable to process input signals 18 to generate output 74 based at least in part on reset pattern 70 generated by reset pattern generator 66 of hardware control module 38, as discussed in greater detail below with reference to FIGS. 4 and 5.

As discussed above with reference to FIG. 2, microcontroller 32 is operable to modify, reprogram, or reconfigure microprogram 52 and/or task specific data 56. As shown in FIG. 3, microcontroller 32 may add a new control word 76 to microprogram 52 or replace an existing control word with new control word 76 in order to modify microprogram 52. New control word 76 may include a new or modified set of pattern properties 78. Thus, microcontroller 32 may modify or reprogram the signal patterns generated by reset pattern generator 66 or some other component of hardware control module 38 by modifying or updating the pattern properties at least partially defining the signal patterns rather than updating or modifying the individual bits which form the signal patterns themselves. Thus, microcontroller 32 need not operate at clock rate in order to modify or reprogram the signal patterns, such as reset pattern 70, used to control datapath 40.

Similarly, microcontroller 32 may add a new data entry 80 or replace an existing data entry with new data entry 80 to modify or update task specific data 56. Like new control word 76, new data entry 80 may be generated by microcontroller 32 in response to a task command received from processor 22, such as described above with reference to FIG. 2.

Figure 4:
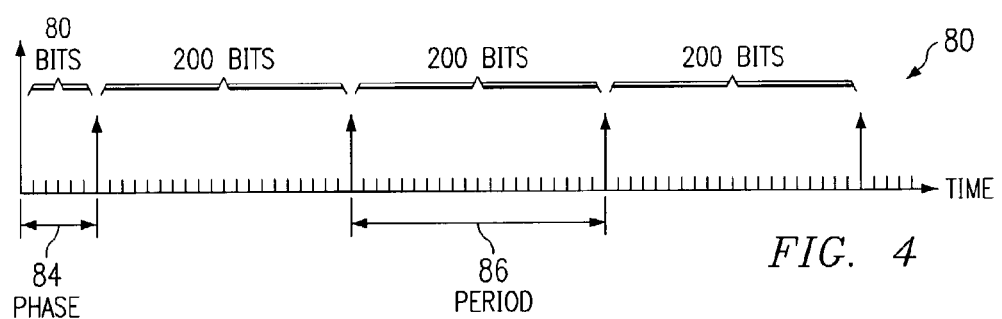
FIGS. 4 and 5 illustrates example bit patterns that may be generated by a hardware control module based on the microprogram of FIG. 3.
Figure 5:
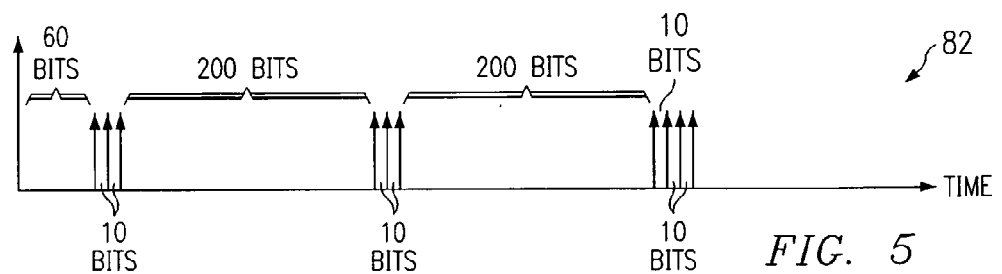

FIGS. 4 and 5 illustrate examples of bit patterns that may be generated by hardware control module 38. For example, the bit patterns shown in FIGS. 4 and 5 may be examples of reset patterns (such as reset pattern 70, for example) generated by reset pattern generator 66. FIG. 4 illustrates a relatively simple bit pattern 80 while FIG. 5 illustrates a more complex bit pattern 82. Each bit pattern 80 and 82 includes a sequence of one-bits (indicated by vertical arrows) and zero-bits (indicated by small dashes between the vertical arrows). Each bit pattern 80 and 82 may be at least partially defined by one or more pattern parameters, such as a phase 84 and a period 86. Thus, for example, the pattern properties 64 included in a particular control word 54 may include properties such as phase 84 and period 86 of bit pattern 80. Reset pattern generator 66 (or some other component of hardware control module 38) may then generate bit pattern 80 based at least in part on these pattern properties 64.

As discussed above with reference to FIG. 2, reset patterns 70 such as bit pattern 80 and 82 may be used to control or drive datapath elements 50. For example, in one embodiment, bit pattern 80 may be used to control accumulator 72. Each bit in bit pattern 80 may represent one clock cycle such that the bits of bit pattern 80 may be consecutively fed into accumulator 72 at the rate of one bit per clock cycle. In some embodiments, each one-bit in a particular bit pattern may operate to reset the particular datapath element 50 being controlled by the bit pattern. Thus, in the example in which bit pattern 80 is used to control accumulator 72, accumulator 72 will be reset each time a one-bit is received.

By controlling or modifying pattern properties 64 which at least partially define bit patterns such as bit patterns 80 and 82 rather than modifying the bit patterns in a bit-by-bit fashion, microcontroller 32 need not feed, adjust, or otherwise control microprogram 52 at clock speed. In addition, using pattern properties 64 to represent bit patterns reduces the size of control words 54 associated with such bit patterns. In addition, by controlling microprogram 52 using microcontroller 32, complex bit patterns such as bit pattern 82 may be generated and modified as desired by processor 22.

Figure 6:
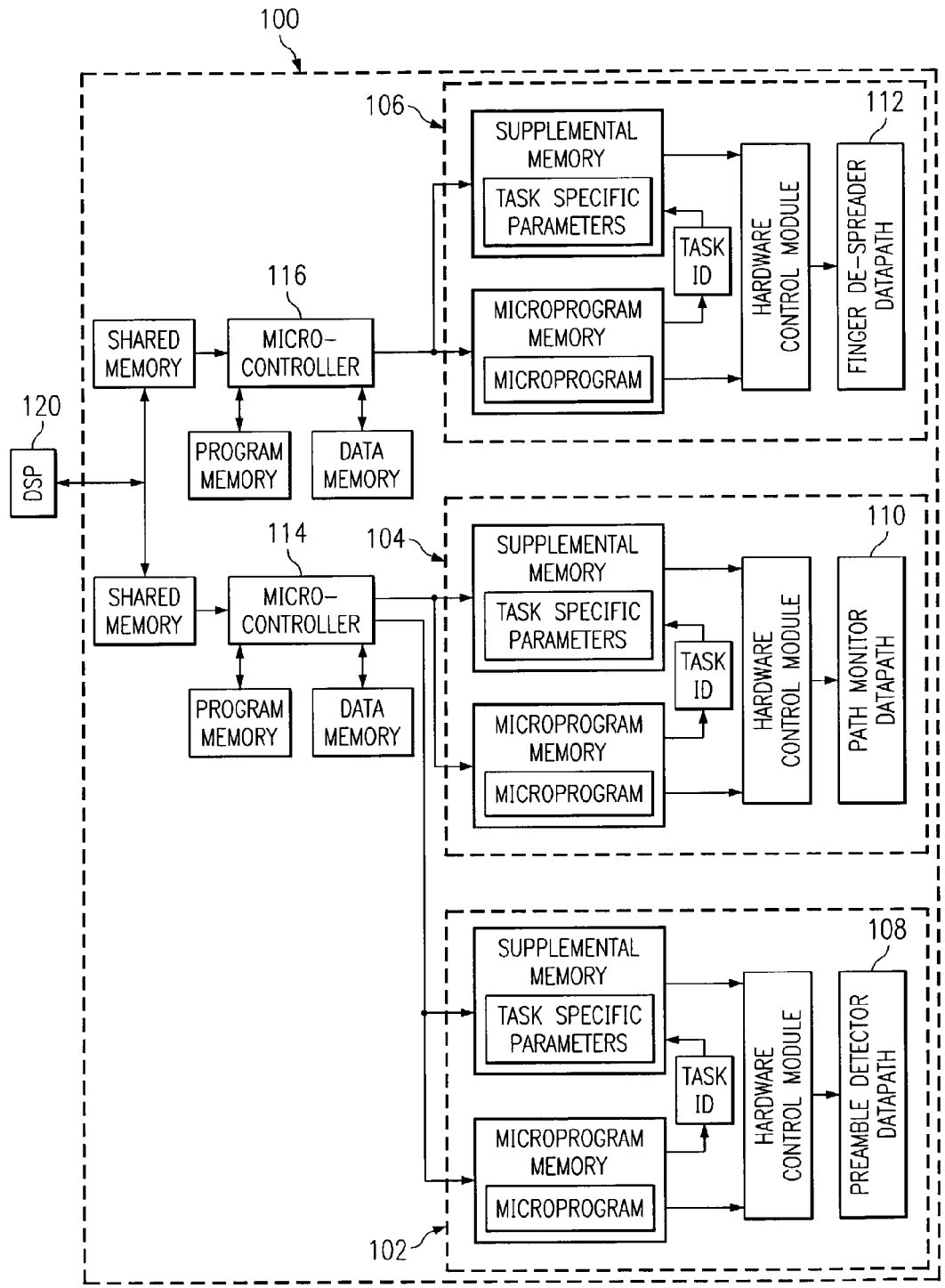
FIG. 6 illustrates a programmable correlation co-processor for use in a CDMA receiver in accordance with an embodiment of the present invention.

FIG. 6 illustrates a programmable correlation co-processor 100 for use in a CDMA receiver in accordance with an embodiment of the present invention. Co-processor 100 includes a plurality of control modules, including a preamble detector control module 102, a path monitor control module 104, and a finger de-spreader control module 106. Each control module 102, 104 and 106 includes a microprogram memory, a supplemental memory, a hardware control module, and a datapath, which may be similar to microprogram memory 34, supplemental memory 36, hardware control module 38, and datapath 40 described above with reference to FIGS. 2-5. Preamble detector control module 102 includes a preamble detector datapath 108 and is generally operable to detect or identify preamble signals communicated from a wireless user via a random access channel (RACH), such as form a wireless user attempting to establish a communication session with a wireless base station (such as base station 14, for example). Preamble detector control module 102 may be operable to perform correlations, such as sliding window correlations, to identify such preamble signals.

Path monitor control module 104 includes a path monitor datapath 110 and is generally operable to monitor multi-paths associated with the signals communicated from a wireless user. For example, as the user moves around, new multi-paths may appear while others may disappear. Path monitor control module 104 may be operable to perform correlations, such as sliding window correlations, to monitor such multi-paths.

Finger de-spreader control module 106 includes a finger de-spreader datapath 112 and is generally operable to separate a plurality of multi-paths associated with a signal from a wireless user and then add the multi-paths together in phase. For example, finger de-spreader control module 106 may separate the plurality of multi-paths by demodulating the wireless signals received from the antenna. Finger de-spreader control module 106 may perform such operations using various correlations, such as correlations performed using an adder tree.

In the embodiment shown in FIG. 6, preamble detector control module 102 and path monitor control module 104 are controlled by a first microcontroller 114, and finger de-spreader control module 106 is controlled by a second microcontroller 116. Microcontrollers 114 and 116 are operable to receive data commands from a processor 120, such as described above regarding microcontroller 32 and processor 22. It should be understood that each microcontroller may be used to control one or more control modules depending on various factors such as the speed of the microcontroller and the size of the microprogram and the complexity of the datapath and bit patterns associated with each control module. Thus, in one alternative embodiment, a single microcontroller is used to control all three control modules 102, 104 and 106, while in another alternative embodiment, each control modules 102, 104 and 106 is controlled by a separate microcontroller.

First and second microcontrollers 114 and 116 may be similar or identical to microcontroller 32 described above. Thus, the microprograms and/or the task-specific data associated with each control module may be repeatedly or continuously adjusted, or reprogrammed, during operation of correlation co-processor 100 to perform various tasks based on a series of task commands communicated by processor 120. Thus, in some embodiments, correlation co-processor 100 may be said to be fully programmable.

Although an embodiment of the invention and its advantages are described in detail, a person skilled in the art could make various alternations, additions, and omissions without departing from the spirit and scope of the present invention as defined by the appended claims.

What is claimed is:

1. A programmable co-processor system, comprising:
   a datapath including a data input, a data output and a plurality of serially connected datapath elements, a first datapath element connected to said data input and a last datapath element connected to said data output, each datapath element receiving data, performing a micro-task upon said data and outputting altered data;
   a microprogram memory storing a microprogram comprising a plurality of control words, each control word including a set of signal pattern properties at least partially defining a signal pattern, each control word being associated with one of the tasks and comprising a task identifier identifying that task;
   an associated memory storing task-specific data corresponding to the plurality of tasks;
   a hardware control module connected said datapath and said microprogram memory, said hardware control module receiving sequentially ordered control words from said microprogram memory and generating one or more signal patterns based on said control words, each signal pattern controlling at least one of said datapath elements, the hardware control module generating the signal pattern associated with a particular control word based on the signal pattern properties included in the particular control word as well as the task-specific data corresponding with the task identified by the particular control word; and
   a microcontroller responsive to a modification command to modify the microprogram by modifying one or more of the control words.

2. The system of claim 1, wherein one of the sets of signal pattern properties comprises the phase and period of at least a portion of the associated signal period.

3. A method for processing signals, comprising:
   storing a microprogram comprising a plurality of control words, each control word including a set of signal pattern properties at least partially defining a signal pattern, in a microprogram memory;
   storing task-specific data in an associated memory, the task-specific data corresponding with a plurality of tasks, wherein each control word is associated with one of the tasks and comprises a task identifier identifying that task;
   receiving a modification command at a microcontroller;
   translating the received modification command into control information;
   modifying the microprogram based on the control information;
   performing data processing upon input signals via a datapath comprising a plurality of serially connected datapath elements;
   controlling the data processing performed by the datapath by receiving sequentially ordered control words from said microprogram memory and generating one or more signal patterns based on said control words, each signal pattern controlling at least one of said datapath elements to perform a micro-task upon data;
   communicating a particular control word and the task-specific data corresponding with the task identified by the particular control word to a hardware control module; and generating the signal pattern associated with the particular control word based on the signal pattern properties included in the particular control word and the task-specific data corresponding with the task identified by the particular control word.

4. The method of claim 3, wherein:
modifying the microprogram based on the control information comprises modifying one or more of the control words based on the control information.

* * * * *